United States Patent
Tal et al.

(10) Patent No.: US 8,693,780 B2
(45) Date of Patent: Apr. 8, 2014

(54) AUTOMATED COLLAGE FORMATION FROM PHOTOGRAPHIC IMAGES

(75) Inventors: Ayellet Tal, Haifa (IL); Lihi Zelnik-Manor, Caesarea (IL); Stas Goferman, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 823 days.

(21) Appl. No.: 12/820,222

(22) Filed: Jun. 22, 2010

(65) Prior Publication Data

US 2010/0322521 A1 Dec. 23, 2010

Related U.S. Application Data

(60) Provisional application No. 61/219,001, filed on Jun. 22, 2009.

(51) Int. Cl.
*G06K 9/46* (2006.01)
*G06K 9/66* (2006.01)

(52) U.S. Cl.
USPC ........................................................ 382/190

(58) Field of Classification Search
None
See application file for complete search history.

(56) References Cited

U.S. PATENT DOCUMENTS

| | | | |
|---|---|---|---|
| 8,218,895 B1* | 7/2012 | Gleicher et al. | 382/275 |
| 2005/0069206 A1* | 3/2005 | Ma et al. | 382/190 |
| 2005/0078172 A1* | 4/2005 | Harville et al. | 348/14.09 |
| 2006/0070026 A1* | 3/2006 | Balinsky et al. | 717/106 |
| 2008/0025639 A1* | 1/2008 | Widdowson et al. | 382/284 |
| 2009/0110269 A1* | 4/2009 | Le Meur et al. | 382/162 |
| 2013/0120608 A1* | 5/2013 | Nakamura | 348/223.1 |

OTHER PUBLICATIONS

Reestriction Official Action Dated Feb. 5, 2013 From the US Patent and Trademark Office Re. U.S. Appl. No. 12/820,222.

* cited by examiner

*Primary Examiner* — Randolph I Chu

(57) ABSTRACT

A computerized method of image processing to form a collage within a predetermined outline from a plurality of images, the method comprising: processing each image to assign a saliency measure to each pixel, said processing utilizing a dissimilarity measure which combines an appearance component and a distance component; finding a first patch of said image and comparing with other patches at different distances from said first patch using said dissimilarity measure, thereby to obtain a score; applying to each pixel of said first patch said obtained score; continuing said comparing and scoring with additional patches of said image until each pixel obtains a score; from said scored pixels providing for each image a region of interest, by setting an initial boundary that encloses a predetermined set of highest scored pixels, and propagating a curve around said initial boundary in such a way as to minimize length and maximize included saliency; and combining said regions of interest into said collage by: ordering said image regions by importance; placing successive regions within said predetermined outline, so as to maximize saliency and compactness and minimize occlusion.

17 Claims, 18 Drawing Sheets
(14 of 18 Drawing Sheet(s) Filed in Color)

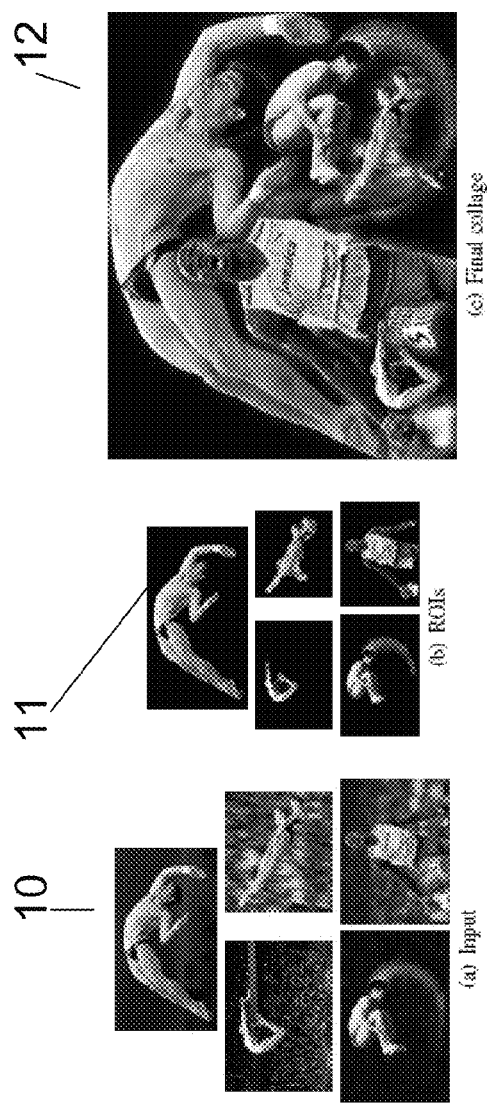
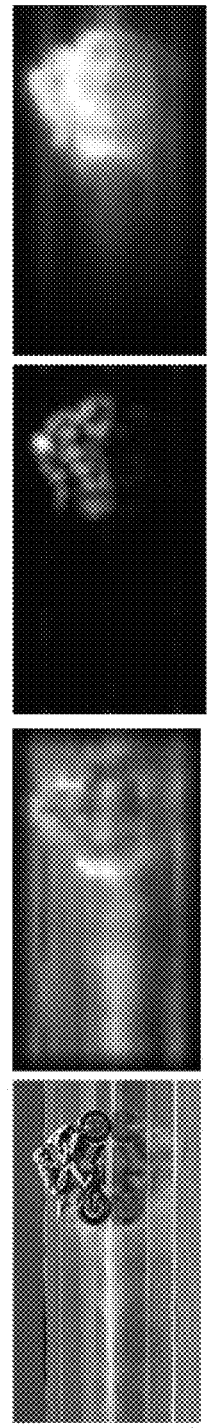

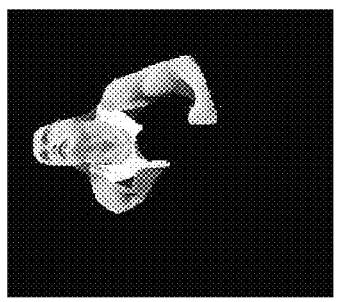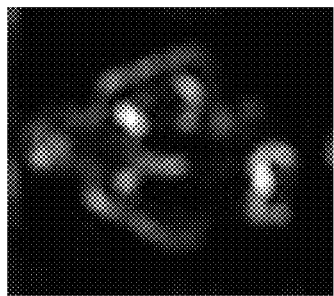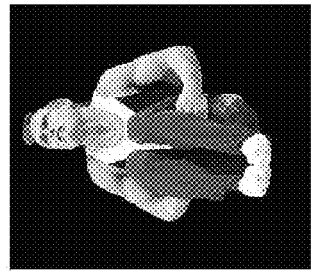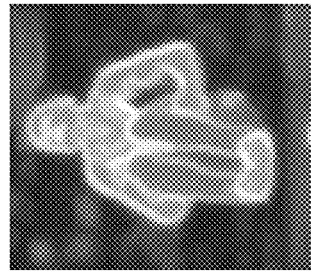
Fig. 7

(a) The collage summarization
(b) The saliency maps of the input images
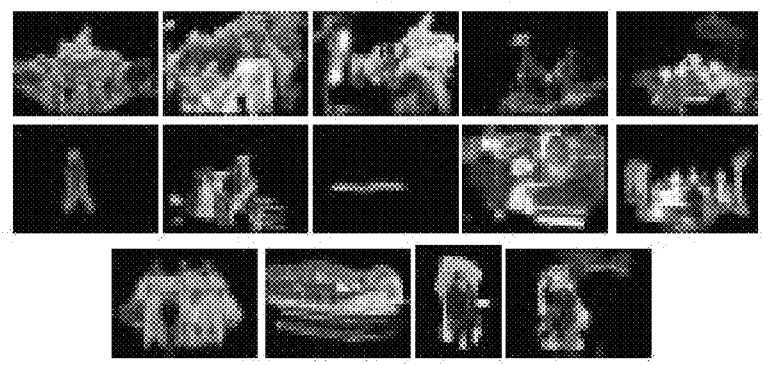
(c) The ROIs
Fig. 9A

AUTOMATED COLLAGE FORMATION FROM PHOTOGRAPHIC IMAGES

RELATIONSHIP TO EXISTING APPLICATIONS

This application claims the benefit of priority under 35 USC 119(e) of U.S. Provisional Patent Application No. 61/219,001 filed Jun. 22, 2009, the contents of which are incorporated herein by reference in their entirety.

FIELD AND BACKGROUND OF THE INVENTION

The present invention relates to a device and method for automated collage formation from images and more particularly but not exclusively from non-uniform regions of interest identified from photographic images.

Collages have been a common form of artistic expression since their first appearance in China around 200 BC. Recently, with the advance of digital cameras and digital image editing tools, collages have gained popularity also as a summarization tool.

A collage is a work of the visual arts, made from an assemblage of different forms, thus creating a new whole. An artistic collage may include a variety of forms, such as newspaper clippings, papers, portions of other artwork, and photographs. While some define a collage as any work of art that involves the application of things to a surface, others require that it will have a purposeful incongruity.

This paper focuses on photo-collage, which assembles a collection of photographs by cutting and joining them together. A photo-collage can be used for art [Ades 1989], as well as for summarizing a photo collection, such as a news event, a family occasion, or a concept. A well-known example is album cover of the Beatles' "Sgt. Pepper's Lonely Hearts Club Band".

Techniques for making collages were first used at the time of the invention of paper in China around 200 BC. Since then, these techniques have been used in various forms, including painting, wood, and architecture, in other cultures, such as Japan and Europe. In-spite of its early creation, the term "collage" was coined much later, by both Georges Braque and Pablo Picasso, at the beginning of the 20th century. These were the times when the use of collages made a dramatic appearance among oil paintings and became a distinctive part of modern art.

Manually creating a collage is a difficult and time-consuming task, since the pieces need to be carefully cut and matched. Therefore, automation could be a welcome tool, in particular for amateurs. Prior work on automating collage creation extracts rectangular salient regions and assembles them in various fashions. In one example, transitions between images are smoothed by graph cuts and alpha blending, which create aesthetic transitions between images. Nevertheless, non-salient regions, typically from backgrounds, cannot be eliminated.

The above approach to assemblage, while informative, does not match in spirit the way in which many artists construct collages. Artists commonly extract the expressive regions of interest, as noted by Henri Matisse "The paper cutouts allow me to draw with color". This approach is expressed in numerous artistic collages, for instance see the pioneering works of "Just What Is It that Makes Today's Homes So Different, So Appealing?" by Richard Hamilton, and the "Dada Siegt" by Raoul Hausmann. The critical boundaries of the important information are considered significant and are thus maintained.

Methods for automatic creation of photo-collages were proposed only recently. A method known as AutoCollage, constructs a seamless collage from a large image set. In this work, rectangular salient image regions are stitched together seamlessly using edge-sensitive blending. In a method called picture collage, a 2D spatial arrangement of rectangular images is optimized in order to maximize the visibility of the salient regions. An improvement to picture collage exploits semantic and high-level information in saliency computation and uses a genetic algorithm for positioning. Google's Picasa features automatic collage generation of whole or cropped images, supporting different styles of compositions.

SUMMARY OF THE INVENTION

The present embodiments provide an approach for automating collage construction, which is based on assembling rounded cutouts of salient regions in a puzzle-like manner. The embodiments may provide collages that are informative, compact, and eye-pleasing. The embodiments may detect and extract salient regions of each image. To produce compact and eye-pleasing collages, artistic principles are used to assemble the extracted cutouts such that their shapes complement each other.

According to one aspect of the present invention there is provided a computerized method of image processing to form a collage within a predetermined outline from a plurality of images, the method comprising:

processing each image to assign a saliency measure to each pixel, said processing comprising:
   providing a dissimilarity measure, said dissimilarity measure combining an appearance component and a distance component;
   finding a first patch of said image;
   comparing said first patch with other patches at different distances from said first patch using said dissimilarity measure, thereby to obtain a score;
   applying to each pixel of said first patch said obtained score;
   continuing said comparing and scoring with additional patches of said image until each pixel obtains a score;
from said scored pixels providing for each image a region of interest, by setting an initial boundary that encloses a predetermined set of highest scored pixels, and propagating a curve around said initial boundary in such a way as to minimize length and maximize included saliency; and
   combining said regions of interest into said collage by:
   ordering said image regions by importance;
   placing successive regions within said predetermined outline, said placing being to maximize saliency and compactness and minimize occlusion, thereby to form said collage.

In an embodiment, said dissimilarity measure is a measure of a patch being distinctive in relation to its immediate vicinity and in relation to other regions in the image, and wherein said distinctiveness for each compared region is weighted for a distance to said patch.

An embodiment may comprise accumulating scores for said pixels from measurements taken from patches at different scales.

An embodiment may comprise using face recognition on said image and assigning to pixels found to belong to a face a high saliency score.

An embodiment may comprise setting pixels whose respective scores are above a predetermined high saliency threshold as a center of gravity and modifying scores of other pixels according to proximity to said center of gravity.

In an embodiment, said pixels having relatively higher saliency scores comprise a smallest group of pixels whose scores add up to a predetermined proportion of an overall saliency score for said image.

In an embodiment, said proportion is substantially 90%.

In an embodiment, said maximizing and minimizing of said curve and maximizing and minimizing of said placing are carried out using respective cost minimization formulae.

In an embodiment, said cost function for placing further comprises a parameter setting a maximum occlusion.

In an embodiment, said cost function for placing penalizes occlusion of higher saliency pixels.

In an embodiment, said placing of image regions after said region of highest importance comprises making a plurality of trial placings and selecting a one of said trial placings which best succeeds with said to maximizing an overall saliency score of visible pixels, minimizing of occlusion of pixels, and maximizing of overall compactness.

In an embodiment, said outline contains a background image on which said regions of interest are placed, taking into account saliency scores on said background image.

According to a second aspect of the present invention there is provided a computerized method of image processing to find salient pixels in a given image, the method comprising:

providing a dissimilarity measure, said dissimilarity measure combining an appearance component and a distance component;

finding a first patch of said image;

comparing said first patch with other patches at different distances from said first patch using said dissimilarity measure, thereby to obtain a score;

applying to each pixel of said first patch said obtained score;

continuing said comparing and scoring with additional patches of said image; and outputting a saliency map indicating pixels and their corresponding saliency scores.

In an embodiment, said dissimilarity measure is a measure of a patch being distinctive in relation to its immediate vicinity and in relation to other regions in the image, and wherein said distinctiveness for each compared region is weighted for a distance to said patch.

An embodiment may comprise accumulating scores for said pixels from measurements taken from patches at different scales.

An embodiment may comprise using face recognition on said image and assigning to pixels found to belong to a face a high saliency score.

An embodiment may comprise setting pixels whose respective scores are above a predetermined high saliency threshold as a center of gravity and modifying scores of other pixels according to proximity to said center of gravity.

According to a third aspect of the present embodiments there is provided a computerized method of image processing to obtain a non-rectangular region of interest in an image where pixels have been scored for saliency, the method comprising:

forming an initial region by drawing a boundary that encloses those pixels having relatively higher saliency scores;

propagating a curve around said initial region, the curve propagation comprising minimizing both a length of the curve and an area included therein; and smoothing the propagated curve, the area included within the smoothed curve providing the region of interest.

In an embodiment, said pixels having relatively higher saliency scores comprise a smallest group of pixels whose scores add up to a predetermined proportion of an overall saliency score for said image.

According to a fourth aspect of the present invention there is provided a computerized method of image processing to form a collage within a predetermined outline from a plurality of non-rectangular image regions, each region comprising pixels scored according to saliency, the image regions being scored according to importance, the method comprising:

selecting an image region of highest importance;

placing said image region within said predetermined outline;

selecting an image region of next highest importance;

placing said region of next highest importance within said outline, said placing being to maximize an overall saliency score of visible pixels, minimize occlusion of pixels, and maximize overall compactness; and continuing to place further image regions of successively decreasing importance within said outline, thereby to form said collage.

Unless otherwise defined, all technical and scientific terms used herein have the same meaning as commonly understood by one of ordinary skill in the art to which this invention belongs. The materials, methods, and examples provided herein are illustrative only and not intended to be limiting.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Implementation of the method and/or system of embodiments of the invention can involve performing or completing selected tasks manually, automatically, or a combination thereof.

Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A is a simplified flow diagram illustrating an overall process flow for forming a collage from input images according to the present embodiments;

FIG. 1B illustrates a process of assigning saliency scores to pixels in the process of FIG. 1A;

FIG. 1C illustrates a process of defining regions of interest (ROIs) in an image based on the saliency scores obtained in FIG. 1B;

FIG. 1D illustrates a process of building a collage given the regions of interest of FIG. 1C;

FIG. 1E illustrates a collage formed according to the process of FIG. 1A;

FIG. 2 shows a series of input images taken through the process of FIG. 1A and a resulting output collage;

FIGS. 3A-3D show an input image of a motorcyclist and his reflection and corresponding saliency maps according to two prior art systems and according to the present embodiments;

FIGS. 4A-4D illustrate four input images and corresponding saliency maps according to two prior art systems and according to the present embodiments;

FIGS. 5A-5C show three input images and shows extraction of regions of interest according to a rectangular outline system and according to the present embodiments;

FIGS. 6A-6E are a simplified diagram illustrating an input image and a saliency map and showing how a boundary is first drawn around the saliency map and then smoothed and rounded;

FIG. 7 is a simplified diagram illustrating an input image and showing saliency maps and corresponding regions of interest according to a prior art system and according to the present embodiments;

Figure 8:
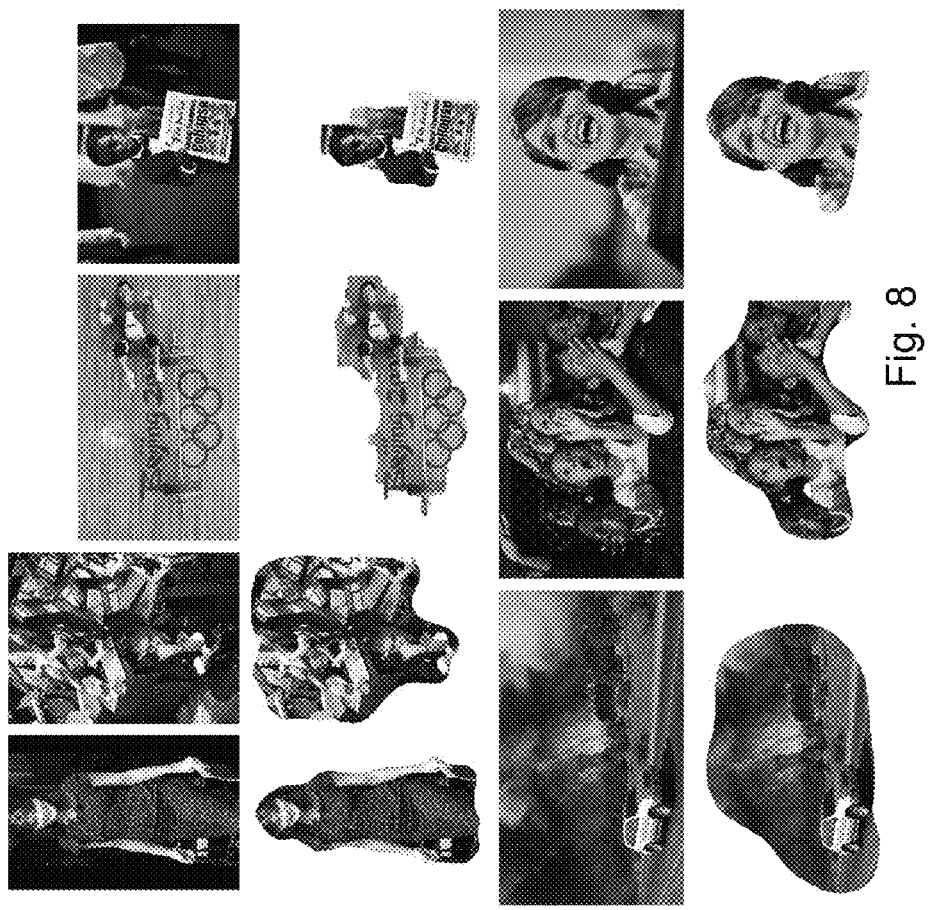
Figure 9C:
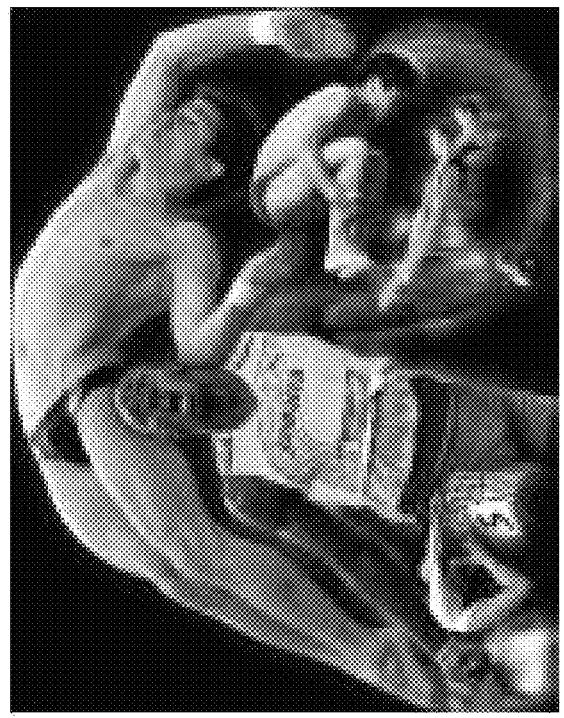
Figure 9B:
Figure 10B:
Figure 10A:
Figures 11A, 11B:
Figure 12:
Figure 13:
Figure 14B:
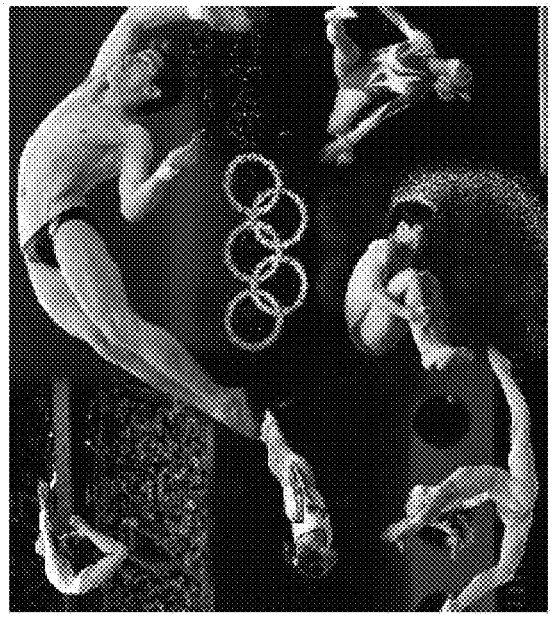
Figure 14A:
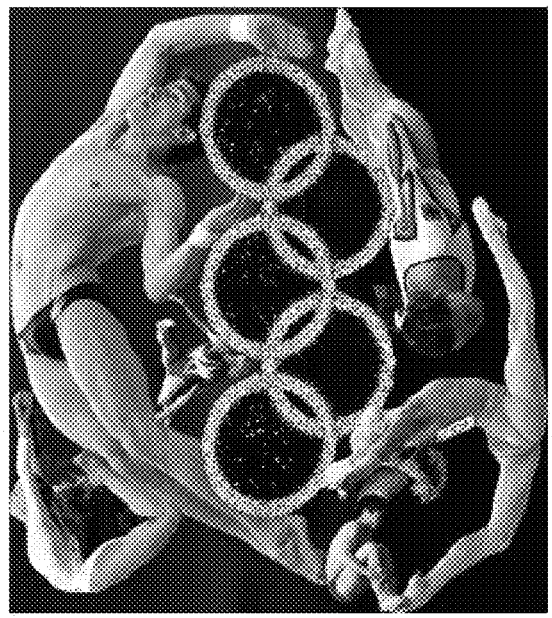

FIG. 8 is a simplified diagram showing seven input images and corresponding regions of interest according to an embodiment of the present invention;

FIG. 9A is a simplified diagram showing input images, region of interest extraction and their formulation into a collage according to an embodiment of the present invention;

FIGS. 9B and 9C illustrate a collage before and after application of local refinement;

FIGS. 10A and 10B show collages of children;

FIGS. 11A and 11B illustrate two collages produced from the same initial image set but with different random initializations;

FIGS. 12 and 13 illustrate two collages, each with a different type of subject matter, both formed according to embodiments of the present invention; and FIGS. 14A and 14B illustrate two collages constructed of the same input images, one using the present embodiments and one using a prior art collage-generating system.

DESCRIPTION OF THE PREFERRED EMBODIMENTS

The present embodiments may comprise a method for automating collage creation, which is inspired by artistic collage. The present embodiments may compose a puzzle-like collage of arbitrary shaped images, as opposed to the rectangular images of the prior art. We show that this creates collages which are more aesthetically appealing. Beyond the realm of aesthetics, space-efficient collages constructed according to the present embodiments are useful for summarization of image data sets.

The present embodiments may require solving three challenges: saliency detection, non-rectangular region-of-interest (ROI) extraction, and assembly of non-rectangular shapes. The following issues are addressed:

A novel framework for photo-collage, comprising assembly of shaped cutouts of interesting regions, rather than rectangular ones.

A new algorithm for saliency-map computation, which incorporates both local and global considerations, yielding accurate saliency maps.

A Region-Of-Interest (ROI) extraction algorithm, which manages to extract non-rectangular regions that coincide with the meaningful information—object boundaries and salient background features.

An assembly algorithm that composes the above ROIs.

Since the shapes are non-rectangular, the assembly problem resembles puzzle-solving. The shapes, however, cannot perfectly match, as assumed in a standard puzzle, and some overlap is allowed.

In the present embodiments, ROI images are in arbitrary shapes, rather than rectangular. Below we briefly review related work on saliency detection, region-of-interest extraction, and image composition—topics related to the main contributions of our work.

Saliency Detection:

Many approaches have been proposed for detecting regions with maximum local saliency of low-level factors. These factors usually consist of intensity, color, orientation, texture, size, and shape. Other approaches incorporate regional and global features. In one approach, a center-surround histogram and color spatial distribution features are used jointly with local multi-scale contrast features to localize salient objects.

In another example, a spectral residual method is proposed, which is able to quickly locate so-called visual pop-outs that can serve as candidates for salient objects.

While these papers compute saliency maps, which have been shown to be useful in a variety of applications, such as object detection, cropping, and image abstraction, they were found to be less appropriate for extracting accurate regions-of-interest. The different methods are either not accurate enough or adapted to a single object of interest.

The present embodiments propose a new saliency computation method, which is suitable for ROI extraction. It is inspired by psychological evidence, and combines both local and global consideration. Throughout the embodiments we provide comparisons with previous work that highlight the differences between the approaches and their results.

Region-of-Interest (ROI) Extraction:

Most previous work on collage construction detects rectangular ROIs. Usually, such ROIs include many non-salient pixels. In one approach, it is proposed to create more space-efficient ROIs by using the convex hull of the salient points. This reduces the number of non-salient pixels, but is still not accurate.

Incorporating segmentation methods with saliency detection has been suggested for extracting non-rectangular ROIs, (however, not for collage assembly). These methods usually segment the image into homogeneous regions and then classify the regions into salient and non-salient groups. Segmentation utilizing region-growing is known.

The segmentation-based methods manage to localize regions well. However, the ROIs might still be insufficiently accurate both due to low-accuracy of the saliency maps and due to errors in the initial segmentation. More importantly, these methods have a different goal than ours—they aim at segmenting the foreground from the background, regardless of the content of the background. In our case, we want all the salient pixels. When the background is not interesting, we would like to exclude it, however, when the background is required for conveying the context, some of it should, and is, kept by our approach.

Assembly:

Constructing a collage from image fragments of irregular shapes resembles assembling a 2D puzzle. The jigsaw puzzle problem is often approached in two stages. First, local shape matching finds pairs of fragments that fit perfectly. Then, a global solution is obtained by resolving ambiguities.

Collages differ from puzzles in that the fragments typically do not match perfectly, and they are allowed to overlap each other. Therefore, the present assembly algorithm aims at finding an informative, yet compact composition.

Compact packing has also been a concern in the creation of texture atlases. However, in atlas packing not only overlaps are not allowed, but also chart rotations are allowed. In fact, the aesthetic solutions proposed for the problem take advantage of that—in one example the charts are oriented vertically, while in another, eight possible orientations are tested. Moreover, the only consideration of these algorithms is compactness, while we aim also at finding appealing puzzle-like matches between the parts.

Framework

Given a collection of n images, we wish to construct an informative, compact, and visually appealing collage. FIG. 2 illustrates the steps of our algorithm on a set of images describing events from the 2008 Olympic games. The user provides the images in FIG. 2(a), the importance of each image (ranked between 0 and 1), a desired aspect ratio for the final result, and sets a parameter controlling the amount of allowed overlap.

The algorithm first computes the saliency of each image, as demonstrated in FIG. 2(b). It can be seen that the saliency maps of the present embodiments capture the importance of different regions. Note how the non-salient background is eliminated in the images of the divers, while the more interesting background is partially kept in the images of the runner and the synchronized divers.

Given these saliency maps, the algorithm computes the ROIs, as shown in FIG. 2(c). Note the non-rectangular ROIs that accurately cut out the salient regions.

Finally, the assembly algorithm generates a puzzle-like collage, by inserting the pieces one-by-one. The importance weights determine both the image sizes and their order of insertion. FIG. 2(d) illustrates this assembly, in which the runner fits in the crevice of the diver and the pair of synchronized divers fit the shape created by the diver's arms.

The principles and operation of an apparatus and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1A:
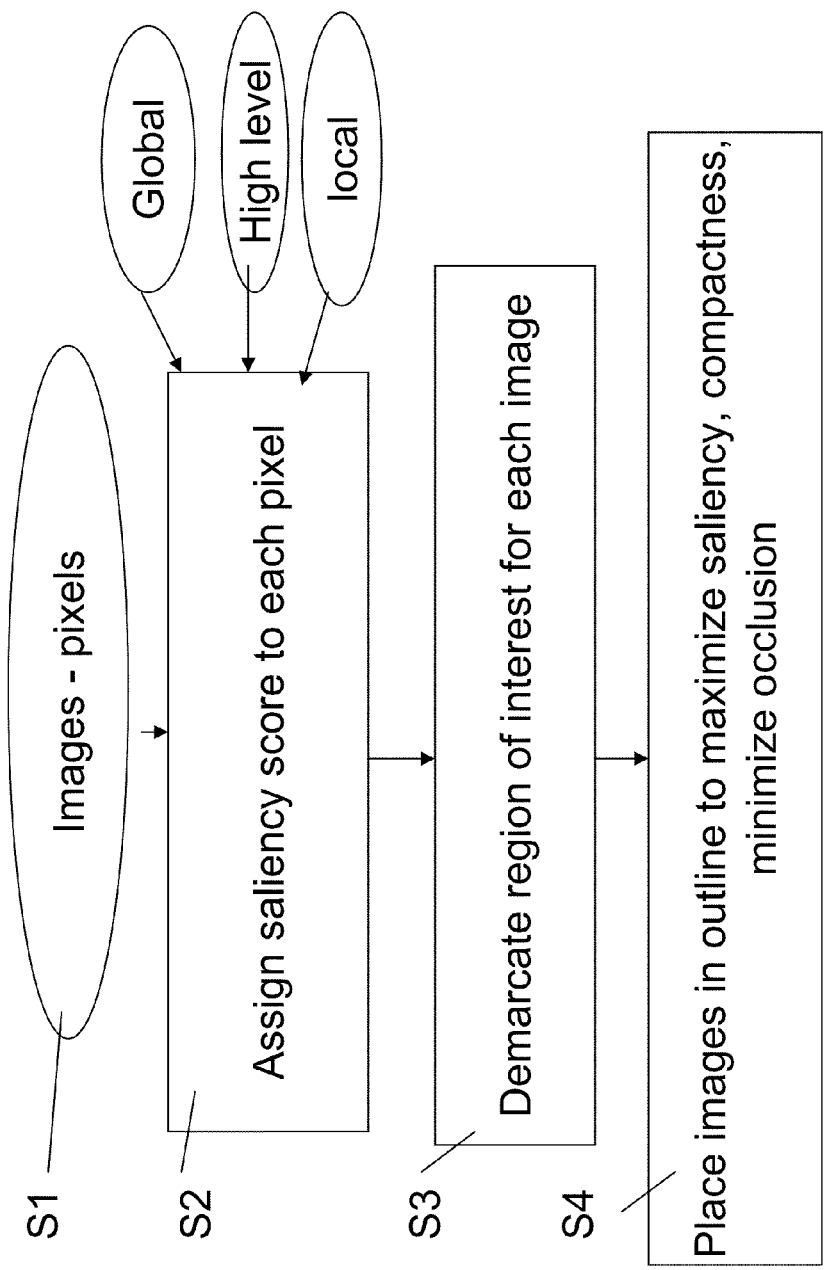

Reference is now made to FIG. 1A which is a simplified flow chart that illustrates a computerized method of image processing to form a collage within a predetermined outline from multiple images, the images typically being photographs. In stage S1, the method takes as input the photographs, which may optionally be ordered according to importance.

In stage S2, the individual images are processed to assign a saliency measure to each pixel. The saliency measure is a measure of information of interest at the location around the given pixel. The saliency measure is obtained from three types of information, local information obtained from comparing the patch containing the pixel to its immediate surroundings, global information obtained by comparing the patch containing the pixel to the image as a whole and high level information, such as discovering that the pixel is part of a special feature, for example a human face. More specifically the saliency measure may be based on a dissimilarity measure which compares different patches of the image. The dissimilarity measure may combine an appearance component so that the measure increases in proportion to visual dissimilarity between the patches and a distance component which reduces the measure the greater the distance there is between the patches.

The dissimilarity measure may thus be a measure of a patch being distinctive in relation to its immediate vicinity and in relation to other regions in the image. The distinctiveness may then be weighted for a distance of the comparison region to the current patch.

The dissimilarity measure is applied to a first patch of the image. The first patch is compared with other patches at different distances from the first patch, and for each patch compared a score is accumulated to each pixel in the patch. Then a new scale may be chosen and patches compared at the new scale. Around four different scales may be used.

An embodiment further sets pixels whose respective scores are above a predetermined high saliency threshold as a center of gravity and modifies scores of other pixels according to proximity to the center of gravity.

Figure 1B:
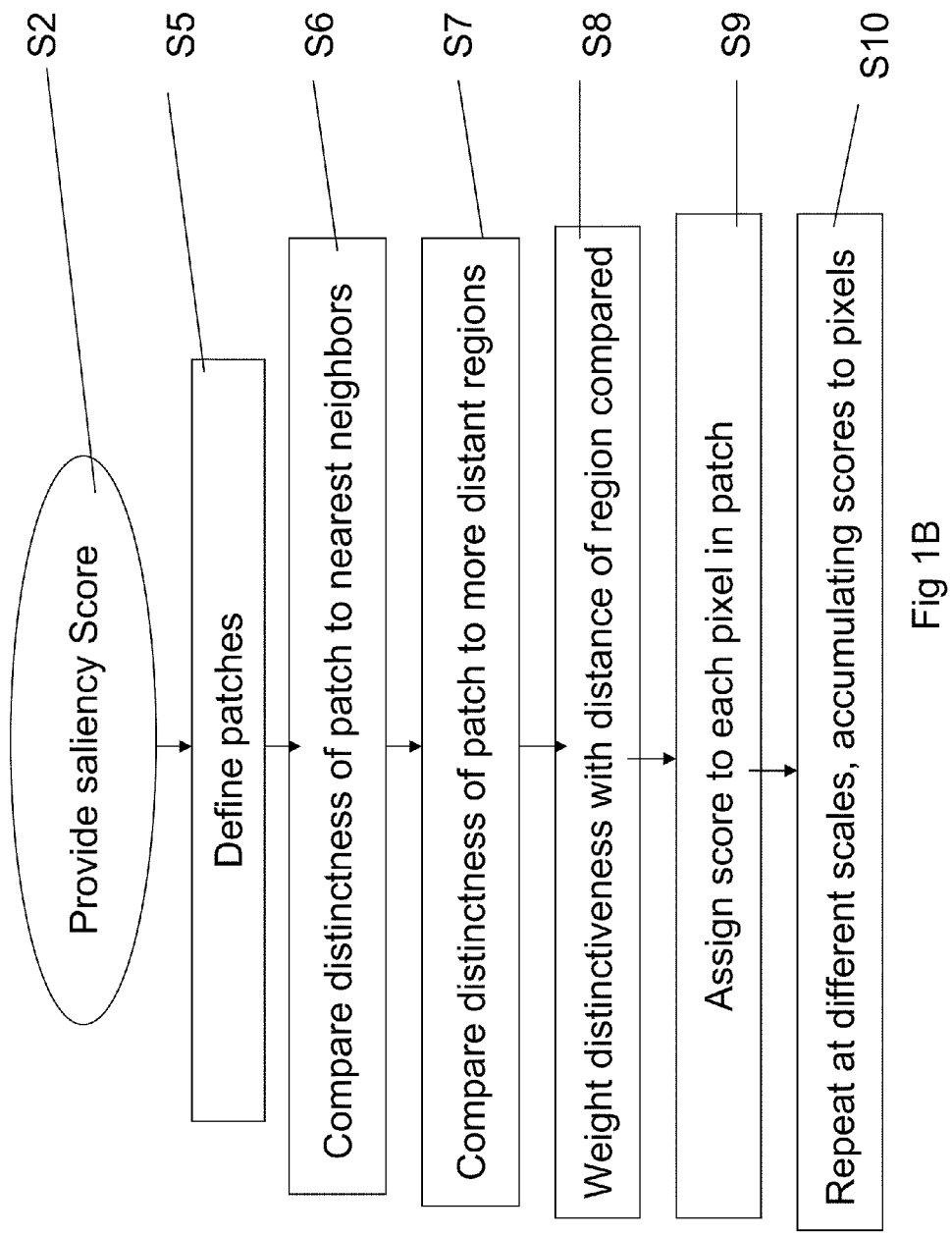

FIG. 1B shows the process of S2 in greater detail. Patches are defined, S5. The distinctiveness of the patch as compared to nearest S6 and steadily more distant neighbours S7 is measured. In S8 the distinctiveness in each case is weighted to the distance. In S9 a score is accumulated to each pixel of the current patch and in S10 the process is repeated at different scales.

Returning to FIG. 1A, and in stage S3 a region of interest within the image is obtained by looking at the pixels with the highest scores and setting a curved boundary that best includes the highest scoring pixels. The boundary may be formed by propagating a curve around the initial boundary in such a way as to minimize length and maximize included saliency.

Figure 1C:
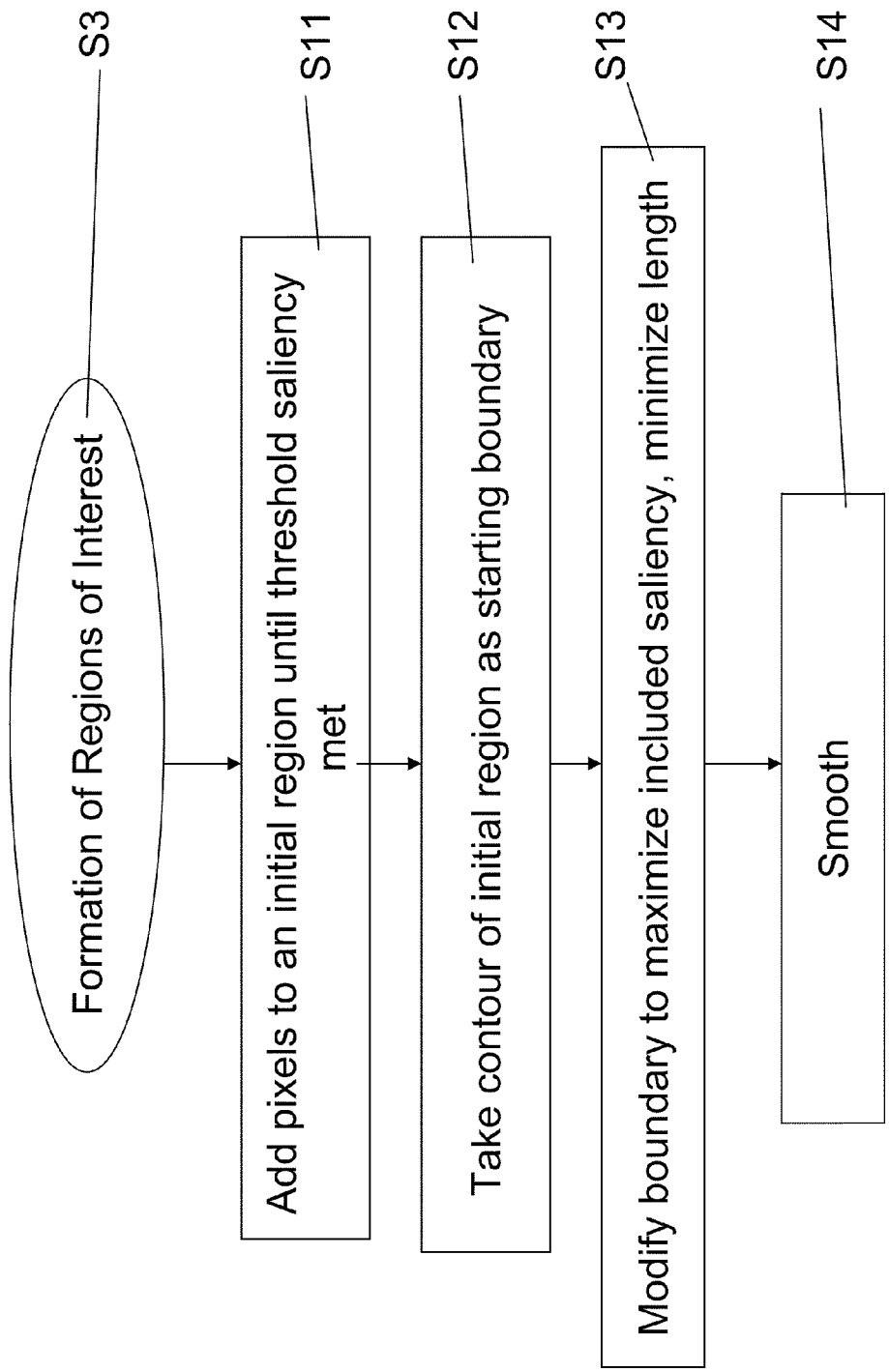

FIG. 1C shows, in more detail, how high scoring pixels may be identified. One way of identifying such pixels is to define a smallest possible group of pixels whose scores add up to a predetermined proportion of the overall saliency score for the image—S11. The proportion may be for example 90%, in which case the smallest possible selection of pixels to add up to 90% of the total image score is identified. A boundary, which may have jagged edges is then defined around the pixels—S12, and a method of cost minimization is used to propagate a curve around the pixels—S13. The boundary is an initial basis for the curve and the cost minimization attempts to maximize the scores within the curve and at the same time minimize the length of the curve. Finally, in S14 the boundary is smoothed.

In stage S4 the regions of interest from each image are combined into an overall collage. As mentioned the images may have been ordered importance. The collage is built up within an outline. Successive image regions are placed one after another in the outline in such a way as to maximize saliency and compactness and minimize occlusion. The result, as the outline is slowly filled, is the collage.

Again, a cost minimization formula is used and the function attempts to maximize saliency and compactness and specifically penalizes occlusion of high scoring pixels. In addition, the cost function may further include a parameter setting a maximum occlusion.

One way of carrying out the placing of the image regions is to make several trial placings, and then select the a one of the trial placings which best succeeds with the cost function, namely which maximizes an overall saliency score of visible pixels, minimizes occlusion of pixels, and maximizes overall compactness.

Figure 1D:
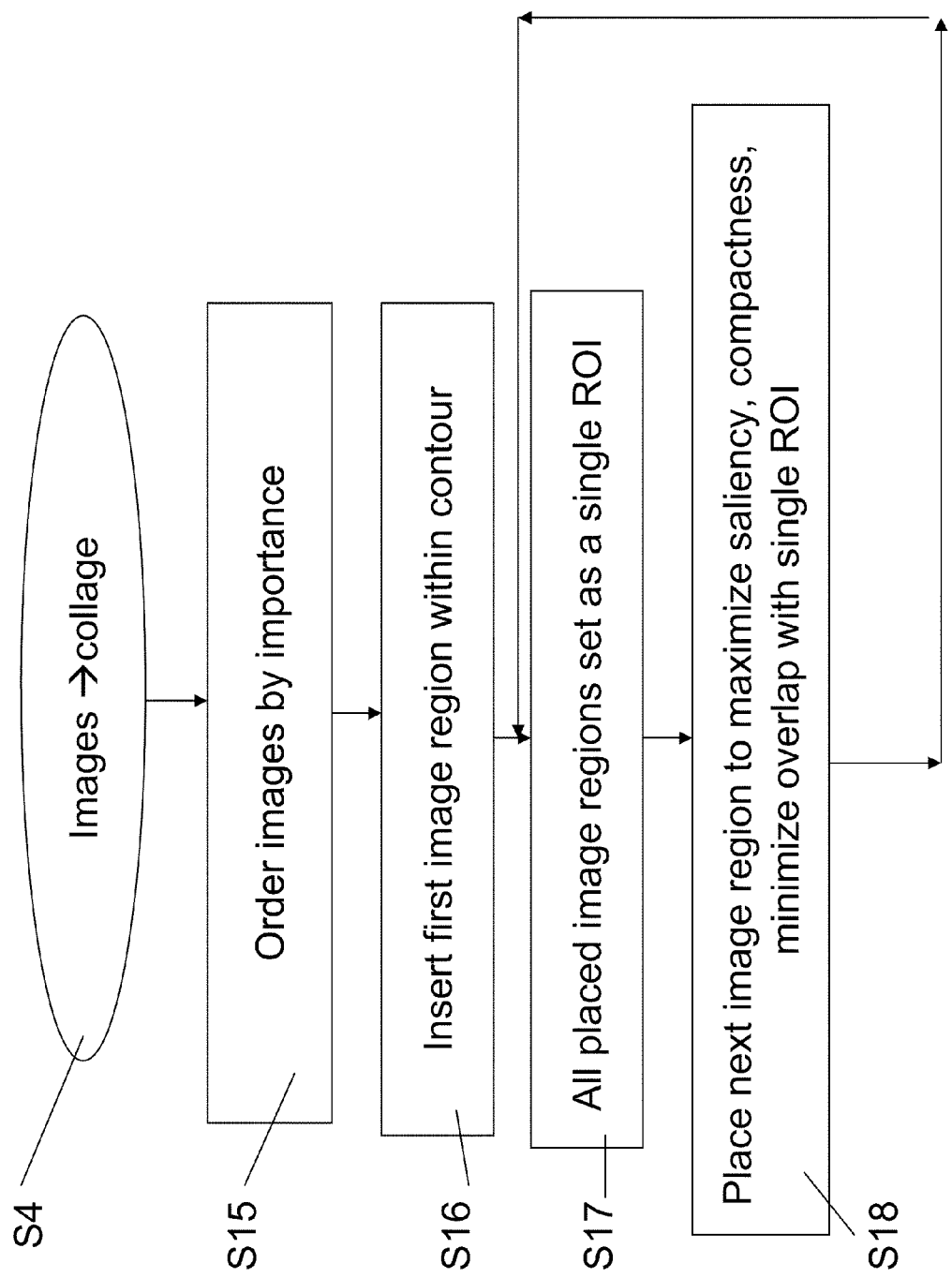

As shown in FIG. 1D, the images are ordered by importance S15. Then the first image is located, S16. Then an image placement loop is entered. All currently placed images are set as a single region S17 and the next region is placed to satisfy the cost criteria as discussed S18.

Figure 1E:
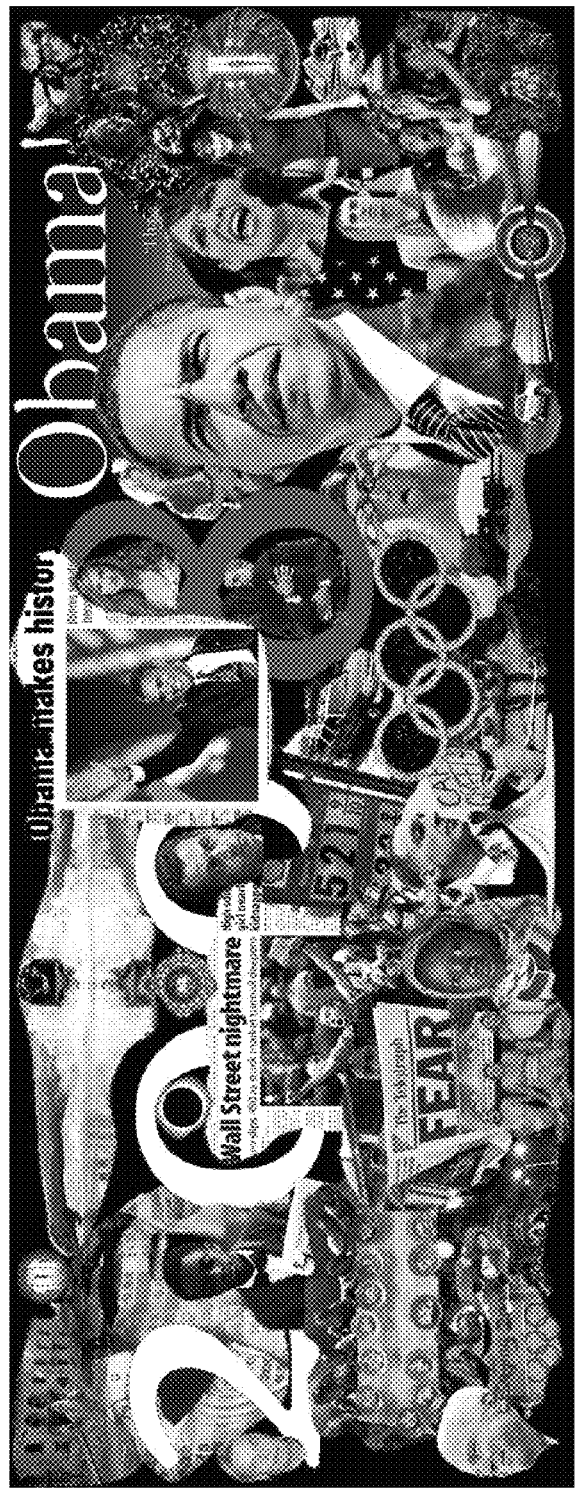

FIG. 1E illustrates a collage constructed according to the present embodiments from a series of images illustrating current events.

The stages are now considered in greater detail.

Reference is now made to FIG. 2, which illustrates how the three stages discussed may provide a collage construction approach. In row 2a a series of input images 10 are shown. In row 2b pixels identified as being salient are marked. In row 3 region of interest are defined around the salient pixels and then finally the regions of interest are fitted together into collage 12.

There are three basic principles to human visual attention: (i) Local low-level considerations, including factors such as contrast, color, orientation, etc. (ii) Global considerations, which suppress frequently-occurring features, while maintaining features that deviate from the norm. (iii) High-level factors, such as human faces.

Most approaches to saliency detection in images are based on local considerations only and employ biologically-motivated low-level features. FIG. 3(b) illustrates why this is insufficient:

the high-local contrast includes all the transitions between the background stripes. An example detects only global saliency, hence, although their approach is fast and simple, it is often inaccurate, see FIG. 3(c). One example incorporates local and global features, thus achieving impressive results. Their approach, however, is tailored to detect a single salient object and no attempt is made to handle other types of images, such as scenery or crowds.

Considering now the identification of salient parts, an approach is used that integrates the local and global considerations discussed above. We consider a certain region in an image to be salient if it is distinctive in some manner w.r.t. (1) its surroundings, i.e., it is locally salient (2) all other possible regions in the image, i.e., it is globally salient. As illustrated in FIG. 3, this allows us to detect the motor-cyclist of FIG. 3a and his reflection in the successive stages of 3b, 3c and 3d.

An algorithm for identification of salient parts according to the present embodiments follows four ideas. First, to take both local and global uniqueness into account, we define a saliency measure that is utilized between close, as well as far pixels in the image. Second, to further enhance the saliency, a pixel is considered unique if it remains salient in multiple scales. Third, following Gestalt rules, an additional global concern is adopted. Finally, to consider high-level factors, faces are detected and marked as salient.

Principles of Context-Aware Saliency

Our context-aware saliency follows four basic principles of human visual attention, which are supported by psychological evidence:

1. Local low-level considerations, including factors such as contrast and color.

2. Global considerations, which suppress frequently occurring features, while maintaining features that deviate from the norm.

3. Visual organization rules, which state that visual forms may possess one or several centers of gravity about which the form is organized.

4. High-level factors, such as human faces.

Related work typically follows only some of these principles and hence might not provide the results we desire.

The biologically-motivated algorithms for saliency estimation are based on principle (1). Therefore, in FIG. 5, middle example, they detect mostly the intersections on the fence. Other approaches focus on principle (2). An algorithm was proposed for extracting rectangular bounding boxes of a single object of interest. This was achieved by combining local saliency with global image segmentation, thus can be viewed as incorporating principles (1) and (2).

We wish to extract the salient objects together with the parts of the discourse that surrounds them and can throw light on the meaning of the image. To achieve this we propose a novel method for realizing the four principles. This method defines a novel measure of distinctiveness that combines principles (1), (2), (3). The present algorithm detects as salient just enough of the fence to convey the context. Principle (4) is added as post-processing.

In accordance with principle (1), areas that have distinctive colors or patterns should obtain high saliency. Conversely, homogeneous or blurred areas should obtain low saliency values. In agreement with principle (2), frequently-occurring features should be suppressed. According to principle (3), the salient pixels should be grouped together, and not spread all over the image.

Local-Global Saliency Measure:

To measure the saliency at a certain pixel we compute the saliency of the patches centered at this pixel, relative to other image patches. For the time being, we consider a single patch of scale r at each image pixel. Later on we relax this assumption and utilize patches of multiple scales.

Let $d(p_i, p_j)$ be a dissimilarity measure between two patches $p_i$ and $p_j$ centered at pixels i, j, respectively. A patch $p_i$ is considered salient if it is dissimilar to all other image patches, i.e., $d(p_i, p_j)$ is always large and the patch is salient both locally and globally. Intuitively, this measure should depend on the patches' appearances. It should be large when the appearances are different and low otherwise.

An appearance-based distance measure is, however, insufficient. To further incorporate global considerations it should also depend on location gap between the pixels. The dissimilarity measure between two patches should decrease when the patches get farther from each other. This is so, because far-away pixels having a similar appearance are likely to belong to the background.

Following these observations, let $d_{color}(p_i, p_j)$ be the Euclidean distance between the vectorized patches $p_i$ and $p_j$ in CIE L*a*b color space, normalized to the range [0,1]. Let $d_{position}(p_i, p_j)$ be the Euclidean distance between the patches' positions, normalized by the larger image dimension. We use the following dissimilarity measure between a pair of patches:

$$d(p_i, p_j) = \frac{d_{color}(p_i, p_j)}{1 + c \cdot d_{position}(p_i, p_j)} \quad (1)$$

where c=3 in our implementation

For every patch pi, we search for the K most similar patches (nearest neighbors) $\{q_k\}^K_{k=1}$ in the image. We define the single-scale value of a patch at pixel i and scale r as $$S_i^r = 1 - \exp\left\{-\frac{1}{K}\sum_{k=1}^{K} d(p_i, q_k)\right\}, \quad (2)$$

Multi-Scale Saliency Enhancement:

Considering patches of a single size limits the quality of results. Background pixels (patches) are likely to have near neighbors at multiple scales, e.g., in large homogeneous regions. This is in contrast to more salient pixels that could have similar neighbors at a few scales but not at all of them. Therefore, we consider multiple scales, so that the saliency of background pixels is further decreased, improving the contrast between salient and non-salient regions.

We represent each pixel by the set of multi-scale image patches centered around it. A pixel is considered salient if it is consistently different from other pixels in multiple scales. One way to compute such global saliency is to consider a pixel to be salient if its multiscale K-nearest neighbors are different from it.

Let $R=\{r_1, \ldots, r_M\}$ denote a set of patch sizes to be considered. The saliency at pixel i is taken as the mean of the saliency values of all patches centered at i:

$$\bar{S}_i = \frac{1}{M}\sum_{r \in R} S_i^r, \quad (3)$$

where $S_i^r$ is defined in Eq. (2). The larger $\bar{S}_i$, the more salient pixel i is and the larger its dissimilarity (in various levels) from the other patches.

In our implementation, to reduce the runtime, rather than taking patches at varying sizes, we construct various scales of the image and then take patches of size (7×7). We use 4 scales: r=100%, 80%, 50%, and 30%. For each scale we further construct a Gaussian pyramid where the smallest scale we allow is 20% of the original image scale. The neighbors of a patch in each scale are searched within all levels of the Gaussian pyramid associated to it.

Further Global Concerns:

According to Gestalt laws, visual forms may possess one or several centers of gravity about which the form is organized. This suggests that areas that are far from the most salient pre-attentive foci of attention should be explored significantly less than regions surrounding them.

We simulate this visual effect in two steps. First, the most attended localized areas are extracted from the saliency map produced by Eq. (3). A pixel is considered attended if its saliency value exceeds a certain threshold ($\bar{S}_i$>0.8 in the examples shown in this paper).

Then, each pixel outside the attended areas is weighted according to its Euclidean distance to the closest attended pixel. Let $d_{foci}(i)$ be the Euclidean position distance between pixel i and the closest focus of attention pixel, normalized to the range [0,1]. The saliency of a pixel is defined as:

$$\hat{S}_i = \bar{S}_i(1 - d_{foci}(i)). \quad (4)$$

High-Level Factors:

Finally, we further enhance the saliency map using a face detection algorithm. The face detection algorithm may directly accumulate scores into the pixels. Alternatively, the face detection algorithm may generate a face map, with all pixels in the face map being given the maximum saliency score. Thus the face map may generate 1 for face pixels and 0 otherwise. The saliency map may then be modified by taking a maximum value of the saliency map and the face map at each pixel. This finalizes the saliency map computation.

Figure 4:
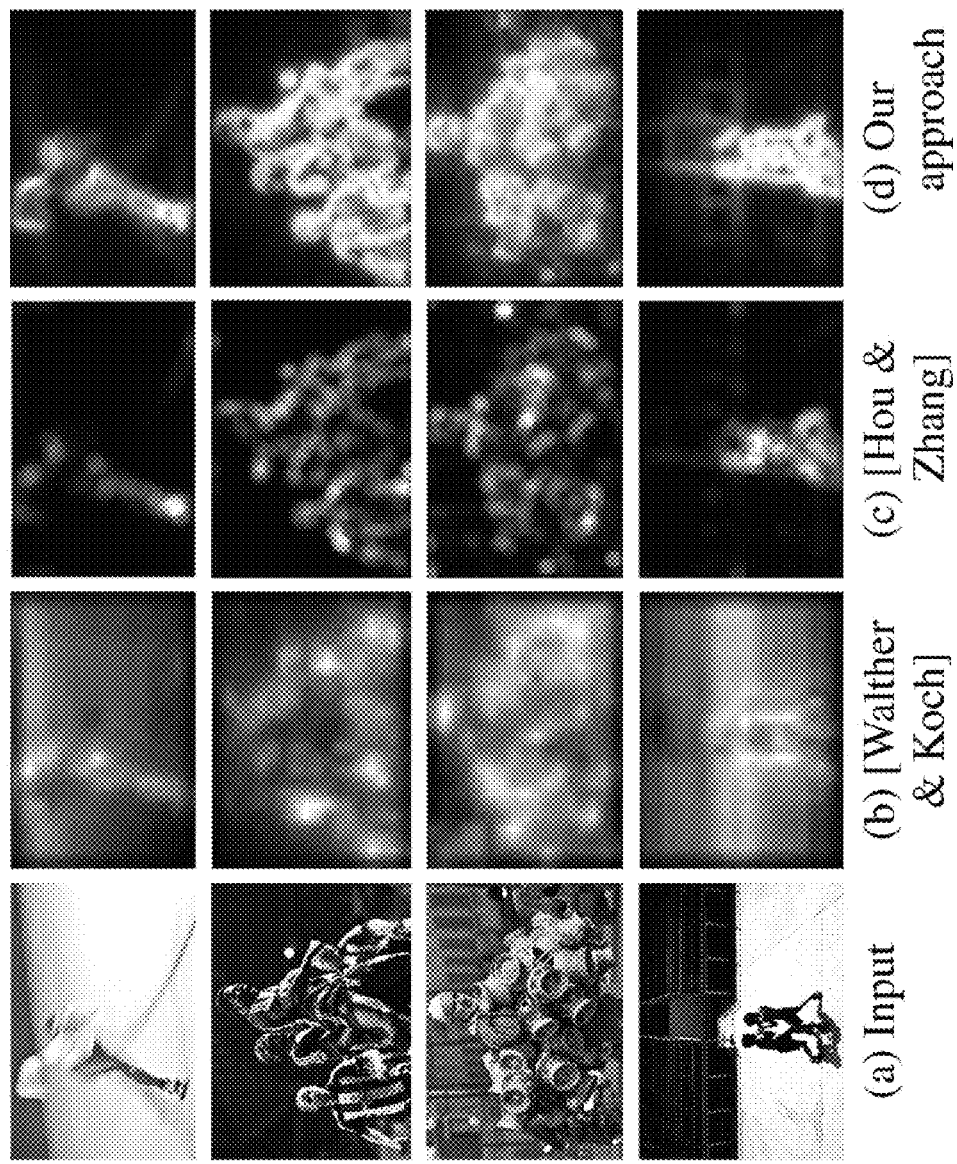

Results:

Reference is now made to FIG. 4 which compares three approaches of saliency detection. Some results of the saliency computation approach of the present embodiments are shown in d) and compared to a biological-inspired local contrast approach in b), and to a spectral residual approach in c), which merely takes into account global information.

While the fixation points of the three algorithms usually coincide, the present embodiments may produce consistently more accurate salient regions than either of the other approaches. More particularly the method of b) has false alarms, since it does not consider any global features (see the image of the two boxing kids). Approach c) lacks accuracy compared to our approach (e.g. only half of the skater is detected).

5 Region-of-Interest (ROI) Extraction

Studies in psychology and cognition fields have found that, when looking at an image, our visual system processes its content in two sequential stages. We quickly and coarsely scan the image in the first pre-attentive stage, focusing on one or several distinguishable localized regions. In the second stage, we further intensively explore the surrounding salient regions, whereas the nonsalient regions of the image are explored only scarcely. Our interest is in the regions in the image that are enhanced and remain salient during the second perceptive stage. These regions provide a better understanding of the image essence, the message it conveys, and maybe also the photographer's main intention behind it.

To follow this principle, we view the saliency map computed at the previous section as an interest measure for each pixel. Our next goal is to extract from each image a region of interest (ROI) of an arbitrary shape, which takes a binary decision at each pixel and labels it as either interesting or not interesting. To achieve this goal we define the following desired properties of an ROI:

1. The ROI should enclose most of the salient pixels.
2. The boundary of the ROI should coincide well with image natural edges.
3. The boundary curve should enable visually appealing compositions (e.g., overly-jagged boundaries are undesired).

These requirements emphasize the difference between the tasks of ROI extraction and foreground-background image segmentation.

Figure 5:
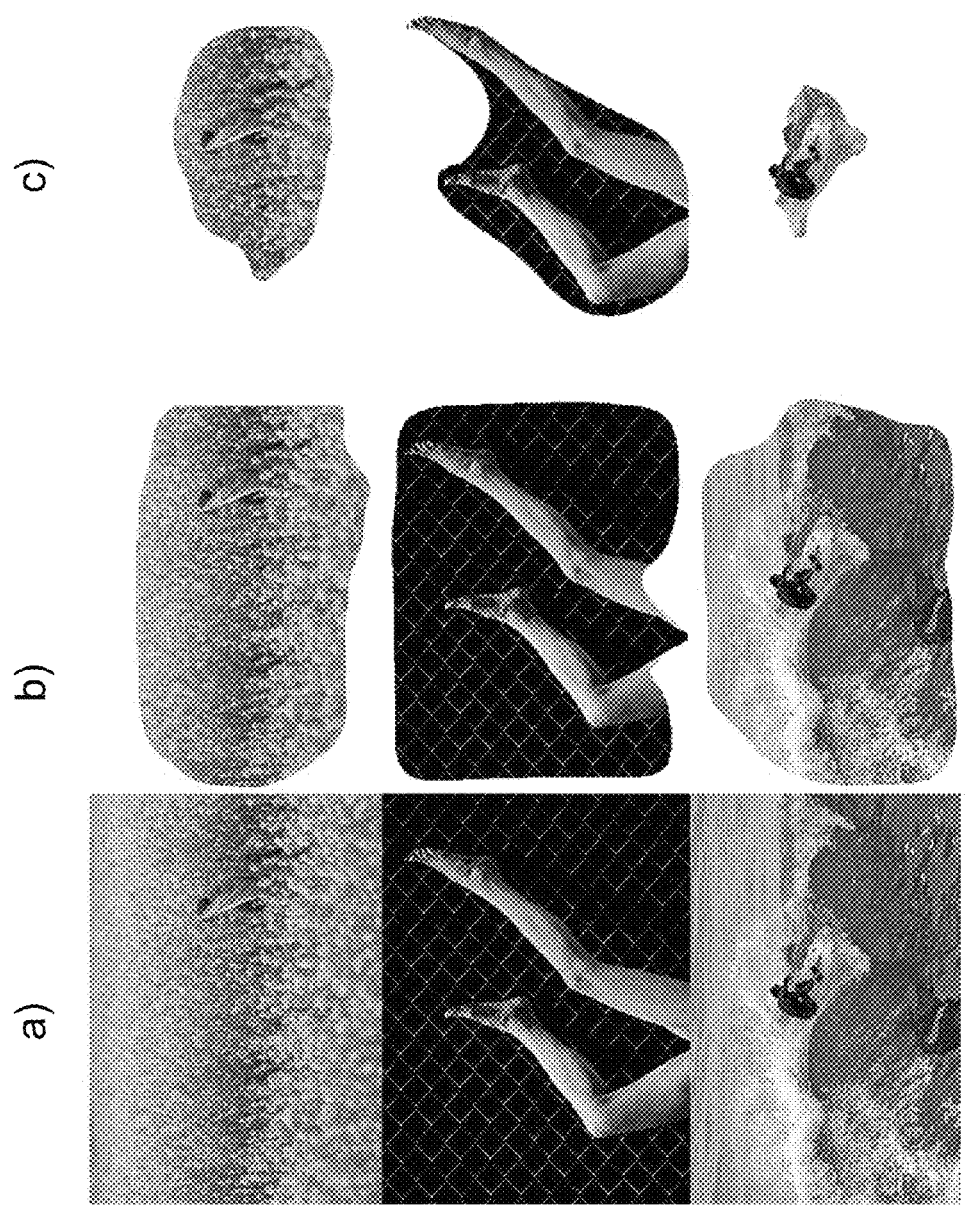

FIG. 5 is a comparative diagram showing input images 5a), regions of interest obtained using rectangular delimitation 5b), and regions of interest obtained according to the present embodiments 5c). ROIs obtained when the initial curve is set to a rectangle include too much of the background, whereas the ROIs obtained using the present embodiments include just enough background to convey the context.

The goal of image segmentation is to extract the foreground objects as accurately as possible, satisfying only the second requirement above. Conversely, ROIs should include all the informative regions (first requirement) and enable pretty compositions later on (third requirement). In other words, ROIs should include pieces of the background, when these are helpful for understanding the picture, or when their inclusion produces more visually appealing ROIs. Albeit, when the background is not informative, it should be eliminated. As referred to above regarding FIG. 5, image segmentation would aim at extracting the person, the blue legs, and the surfer. The corresponding ROIs, on the other hand, should include also parts of the background field, chicken-wire, and waves, to convey the content of these images. Note that not all the background should be included—only enough of it for conveying the context.

The algorithm of the present embodiments may consists of three steps, which incorporate saliency and edge information, in order to comply with the requirements.

Figure 6:
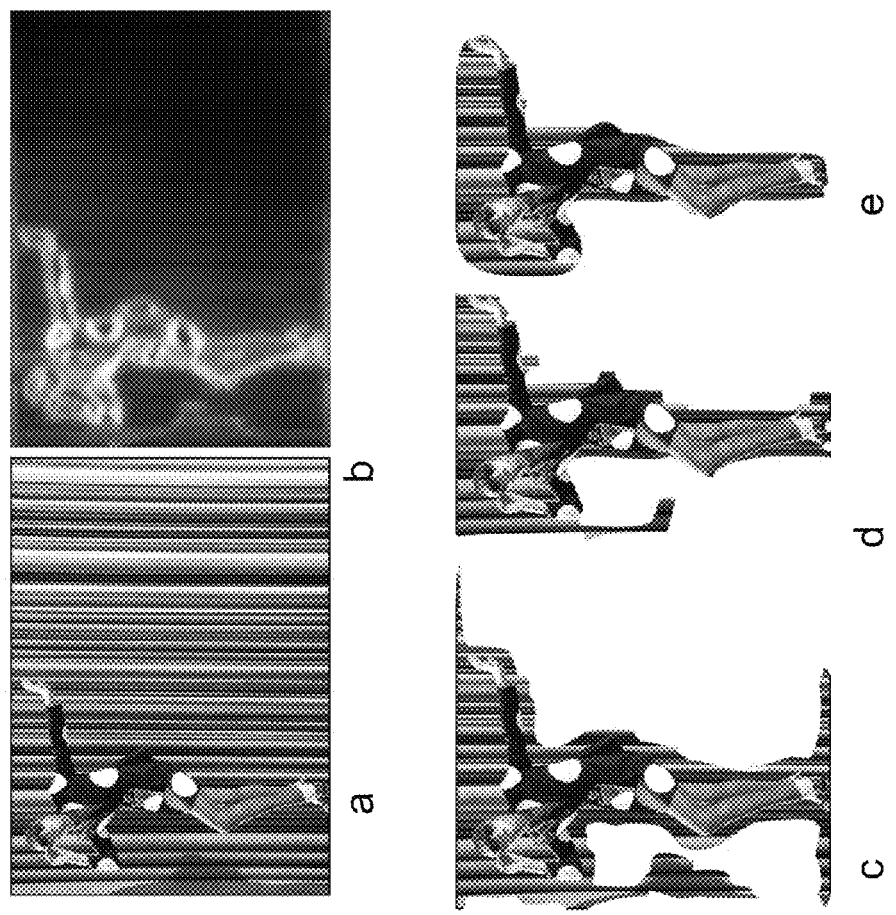

The stages are illustrated in FIG. 6. An initial input image is shown in 6a. A saliency map is shown in 6b. An initial curve is constructed from the saliency map as shown in 6c. The curve is propagated towards the image natural edges as in 6d, and finally is smoothed based on the saliency to provide the final ROI in 6e. We elaborate below.

Curve Initialization:

Curve initialization aims at satisfying the first requirement. Initialized by an empty ROI, pixels are added to it sequentially, starting from the highest saliency values to the lowest. This continues until the total saliency of the included pixels reaches a pre-defined percentage of the total image saliency. In our implementation, we require 90%.

This results in a binary mask of one or more connected components of "interesting" regions (see, FIG. 6(c)). The boundary of the largest connected component serves as an initial contour for the next step. FIG. 5 demonstrates the effect that the curve initialization has on the final ROI extraction. When feeding the present algorithm with the boundary of the image as an initial curve, its propagation gets stuck very early on background edges. This does not occur when initialized as described above.

Curve Propagation:

To satisfy the second requirement, the initial curve is propagated towards the image edges, while keeping in mind the saliency information. This is done by employing the level-set approach. In this approach, the curves (active contours), are represented by the zero level set of a level-set function f(x,y, t). The evolution equation can be written as:

$$\phi_t + F(\phi) = 0.$$

The function F (the speed function) is found by minimizing some cost function. A common function consists of two terms—$L_g(\emptyset)$, $A_g(\emptyset)$—the weighted length of a curve and the weighted area bounded by it—weighted by g, the edge indicator function:

$$L_g(\phi) = \int_\Omega g\delta(\phi)|\nabla\phi|dxdy,$$

$$A_g(\phi) = \int_\Omega gH(-\phi)dxdy.$$

Here δ is the univariate Dirac function, H is the Heaviside function, and Ω is the image range.

We select $g=1/(1+|\nabla I_s|^2)$, where $I_s$ is a smoothed version of the image, smoothed by an anisotropic edge-preserving diffusion. We have found that this results in a curve that coincides more accurately with the image boundaries.

To avoid re-initialization, one may introduce an internal cost term that penalizes the deviations of the level-set function from the signed-distance function, especially around the zero-level set:

$$P(\phi) = \int_\Omega \frac{1}{2}(|\nabla\phi|-1)^2 dxdy.$$

We adopt this term and further add a saliency-based curve length term, $L_h(\emptyset)$. The objective of this term is acceleration of the curve evolution when the curve encounters locally strong, but non-salient, edges, which occur at many background non-salient pixels. We use $$L_h(\phi) = h\int_\Omega \delta(\phi)|\nabla\phi|dxdy,$$

where h is a saliency indicator function defined by:

$$h = \exp\left\{\frac{-\hat{S}^2}{\sigma_s^2}\right\}$$

with i $\hat{S}$ being the saliency map of the image, and $\sigma_s$ the value of its variance.

Putting it all together, the total cost functional is defined by:

$$\epsilon(\phi) = \mu P(\phi) + \lambda L_g(\phi) + \gamma L_h(\phi) + \nu A_g(\phi). \quad (5)$$

Using calculus of variations, it can be shown that the steepest descent process for minimization of the function $\epsilon(\emptyset)$ is the following gradient flow:

$$\frac{d\phi}{dt} = \mu[\Delta\phi - \kappa] + \lambda\delta(\phi)\left(g\kappa + \frac{\nabla\phi}{|\nabla\phi|}\right) + \gamma\delta(\phi)h\kappa + \nu g\delta(\phi),$$

where $$\kappa = div\left(\frac{\nabla\phi}{|\nabla\phi|}\right)$$

is the curvature of the level sets of Ø(x,y, t).

In our implementation, we used λ=10, ν=1, μ=0.05, and γ=10. The level-set function is initialized to −2 inside the ROI and +2 outside it.

The curve evolution continues until either a maximal number of steps (1000) is reached (i.e., we cannot go too far from the initial curve) or the sum of the image saliency values inside the curve drops below a certain level (50% of the total saliency). An example result is presented in FIG. 6(d).

An alternative approach is based on a geodesic active contours model [CKS97] and modified it to incorporate saliency. Here the curve C is represented implicitly via a function Ø, by C(t)={(x,y)|Ø(t,x,y)=0}, and the evolution of the curve is given by the zero-level curve at time t of the function Ø(t,x,y):

$$\frac{\partial\phi}{\partial t} = \lambda|\nabla\phi|G(\phi) + \gamma|\nabla\phi|H(\phi), \quad (1)$$

$$G(\phi) = div\left(g(|\nabla u_0|)\frac{\nabla\phi}{|\nabla\phi|}\right) + \nu g(|\nabla u_0|),$$

$$H(\phi) = h\kappa(\phi).$$

In Equation (1) $u_0$ is the lightness channel, g(.) is an edge indicator function, h is a saliency indicator function and ν is a positive constant pushing the curve inwards. The curvature of the level-set function is defined by $\kappa=\text{div}(\nabla\phi/|\nabla\phi|)$. Note that setting $\gamma=0$ results in a geodesic model, where the zero-level curve moves in the normal direction with speed G and stops on the desired boundary, where g vanishes. Setting $\lambda=0$, we get a saliency-based evolution in the normal direction with speed H, where the curve stops on salient regions.

The importance of our saliency term H is twofold. First, it accelerates the curve evolution in non-salient regions. This is especially pertinent when the curve encounters locally strong, but non-salient edges, which occur at many background non-salient pixels. Second, it slows down the evolution in salient regions.

We set $g(\nabla u_0)=1/(1+|\nabla G_\sigma * u_0|^2)$, where $G\sigma * \mu_0$ is a smoothed version of $\mu_0$. Gs is the Gaussian kernel with standard deviation 1.5. The saliency indicator function is selected by $h=\exp h=\exp\{-\hat{S}^2/\sigma_s^2\}$, where $\hat{S}$ is the saliency map and $\sigma_s^2$ is its variance.

The level-set evolution is implemented using a numerical scheme which eliminates the need of reinitialization of f, where the zero-level curve at $t=0$ is the curve from the previous step. In our implementation, we used $\lambda=3$, $\gamma=5$, $\nu=1$.

The evolution continues until either a maximal number of steps (1000) is reached (i.e., we cannot go too far from the initial curve) or the sum of the image saliency values inside the curve drops below a certain level (50% of the total saliency).

Curve Visual Enhancement:

As can be seen in FIG. 6(d), the propagated curve bounds the region of interest. However, the curve itself might be still jagged, since in the previous stage it was pushed to pass through the image edges, which may be non-smooth. The goal of the current stage is to further smooth the curve in accordance with the saliency, so that later on it can be nicely matched to other shapes in the collage. Thus the end result, as shown in FIG. 6(e).

The curve visual enhancement may be achieved by applying the level-set evolution of Eq. (5), taking into account mostly the saliency. We set $\mu=0.05$, $\lambda=\nu=0$ and $\gamma=10$, and enforce the same stopping criteria. Note that in this formulation, the curve's curvature is smoothed while its length barely changes since its propagation is stopped by high-saliency values. Moreover, the evolution is stronger where the saliency is low, as expected.

This stage may be performed using an accurate saliency map. Referring now to FIG. 7, we see a comparison of ROIs obtained using different methods. Specifically the second row shows a saliency map produced using the present methods and the corresponding ROI. The top row by contrast shows the present ROI extraction algorithm, but using the saliency map produced by the global method of FIG. 4c). It can be seen that use of the present embodiments manages to extract the ROI more accurately.

FIG. 8 presents shows a series of seven input images and the corresponding extracted ROIs obtained using the present embodiments.

6 Collage Assembly

The last step of our framework is the assembly of the extracted ROIs. The present algorithm expects as input a set of n images, together with their ROIs and saliency maps. We also assume that each image is ranked by some importance factor between 0 and 1, where the higher this weight, the higher the importance. These importance weights can be provided manually or randomly assigned. The images are scaled according to these importance weights. Finally, the user also provides a desired aspect ratio for the final result and sets a parameter controlling the amount of allowed overlap.

Our goal is to generate a collage that satisfies the following properties:

(1) Informativeness: The collage should include as much as possible from every image's region of interest.

(2) Compactness: The collage should utilize the canvas efficiently, subject to a desired aspect ratio.

FIG. 9A presents a collage, where the present algorithm utilizes the geometries of the salient regions and produces a compact, yet informative collage. The collage is shown in 9A(a), the saliency maps in 9A(b) and the ROIs in 9A(c).

In searching for an assemblage algorithm we turned to the puzzle solving literature. Their solutions, however, were found inadequate, since in our case the shapes do not perfectly match as they do in puzzles. A more fruitful avenue to follow was to consider the basic problem of 2D bin packing. Our assembly problem can be viewed as a generalization of 2D bin packing, where in our case the parts are not constrained to be rectangles and overlaps are allowed.

2D bin packing has been shown to be NP-hard, nevertheless, there exists a variety of approximated solutions. We draw inspiration from a general strategy in which a best-first decreasing approach is proposed. In our case the best ROI to place is the most important one. The present algorithm proceeds as explained above with respect to FIG. 1D. First, the images are sorted by their importance weights, in decreasing order. Then, starting from the most important, perhaps the largest, image, the images are positioned one-by-one. At each iteration we consider the images already placed as a single ROI. This reduces the problem to placing one new ROI with respect to one other. We calculate a set of possible locations in which the new ROI can be placed. We then compute a cost function, for all placements and select the one that minimizes the function. In our implementation, since we allow overlaps, the saliency map of the merged ROI is taken as the saliency values of the visible pixels, ignoring occluded ones. Below we discuss the possible placements and then focus on the composition cost function.

The set of possible placements consists of those satisfying two conditions:

(i) The intersection between the two ROIs is not empty.

(ii) The placement should respect the preferred aspect ratio. This is achieved by accepting only locations whose aspect ratio is similar to the desired one.

Composition Cost Function:

Given two ROIs and a joint placement, we define their composition cost function as:

$$E=E_{compact}E_{info}^\alpha. \qquad (6)$$

Minimizing the first term $E_{compact}$ will place the ROIs in a space efficient way. Since we allow overlap, the most compact placement is laying them on top of each other. Minimizing the second term $E_{info}$ may create an informative composition by penalizing the occlusion of salient pixels. The most informative way to place the ROIs together is to position them next to each other, without any overlaps. Obviously, the two terms aim for opposite goals—a highly informative layout is not compact and vice versa. The present algorithm may find a good compromise between the two. To allow for further flexibility we add the parameter $\alpha$, which controls the amount of allowed overlap. In our experiments we use $\alpha$ between 1 and 4. We next describe these cost terms.

Compactness Cost: Given a pair of ROIs, $R_i$ and $R_j$, a compact placement can be obtained by minimizing the area of their bounding rectangle. Let bound be the area of the axis-aligned minimal bounding rectangle. We wish to minimize $$E_{rect}(i,j)=\text{bound}(R_i \cup R_j). \qquad (7)$$

This may guarantee compact layouts, however, it could be insufficient for matching protrusions and depressions of the ROIs. Therefore, we also minimize the empty space between the ROIs. This is done by computing the convex hull of the placement of the two shapes and then subtracting the area not covered by any of the shapes. Formally, let conv be the area of the convex hull of a given shape, we wish to minimize $$E_{conv}(i,j) = conv(R_i \cup R_j) - (R_i \cup R_j) \quad (8)$$

Since convex hull computation is time-consuming, we save running time by computing $E_{conv}$ on a sparser grid (of 10×10 pixels). Note that minimizing each term alone does not suffice. Minimizing only $E_{conv}$ could result in diagonal or elongated shapes which are unappealing. Minimizing only $E_{rect}$ may create non puzzle-like compositions. Therefore, we incorporate both terms and define the compactness cost cost as $$E_{compact}(i,j) = \hat{E}_{rect}(i,j) \omega_r \hat{E}_{conv}(i,j), \quad (9)$$

where $\hat{E}_{rect}$ and $\hat{E}_{conv}$ are normalized versions of $E_{rect}$ and $E_{conv}$, respectively. The normalization re-scales the energies to the range [0,1] over all possible locations. In our experiments we set $\omega_r = 2$.

Informativeness cost: Overlaying images might cover important regions. In order to maximize the informativeness, salient regions should not be occluded. Given a placement, we should determine which ROI will (partially) cover the other and compute a cost for this overlay. Recalling that in our case one ROI is actually a union of the already placed ROIs, there are multiple layering options for the new ROI, i.e., it could occlude some and be occluded by others.

To save running time, when selecting a placement we first consider only two layering options: the new ROI can be either on top or below the merged ROI.

We define a cost function as the sum of the saliency values of the occluded ROI in the intersection area of the two ROIs:

$$E_{info}(i,j) = \min_{k=i,j} \left( \frac{\sum_{R_i \cap R_j} \hat{S}_k}{\sum_{R_k} \hat{S}_k} \right), \quad (10)$$

where $\hat{S}_k$ is the saliency map of the image k.

After a placement has been selected, we further compute the informativeness cost for all possible layerings of the new ROI and accept the one which minimizes $E_{info}$.

Local refinement: We further refine the assembly via a random sampling process, which improves the collage compactness, informativeness and its visual appearance. Our method is inspired by a Markov chain Monte Carlo (MCMC) methodology and is based on a hit-and-run algorithm. We adopt an effective random sampling process that reduces the composition cost function by applying random transformations (scale, rotation and translation) to the ROIs and by changing their layering positions.

At each time step we choose uniformly one of the ROIs to be translated by $\vec{r}$ pixels, rotated by $\theta$ degrees, and scaled by a factor s. These are sampled from normal distributions: $r \sim N(0;30)$; $\theta \sim N(0;5)$; $s \sim N(1;0.2)$. With probability 0.5 we also change the ROI's layer by uniformly sampling a new layer. We consider only samples where $s \in [0.5, 2]$ and $\theta \in [-30, 30]$ and accept only those that reduce the composition cost function Eq. (2). The sampling is stopped when a cumulative acceptance rate of 5% is reached.

FIG. 9B illustrates a collage before application of local refinement and FIG. 9C illustrates the same collage after application of local refinement.

7 Results

FIGS. 10-14 illustrate some of our results. A feasible way to construct a collage, which is common in art, is to choose a background image that covers the canvas, and then place the carefully cut images on top of it. Thus, the artist selects a background image with a special role. In our system, we can follow this strategy and allow the user to select a background image. However, in our results we use the image that our algorithm places at the bottom to fill the background. Whether selected manually or automatically, the background image is not treated as background only, but rather we position the other images with respect to its ROI, as done for all other images. This way the informative regions of the image remain visible in the collage.

FIG. 10 shows a collage that summarizes some events from the gymnastics of the 2008 Olympic games. Since the gymnasts exhibit highly acrobatic poses, they create unique irregular shapes. Our algorithm takes advantage of those and creates a puzzle-like collage, as can be seen for instance in the nice fit between the gymnast in red and her neighboring gymnasts.

FIGS. 11A and 11B present two collages of the same set of images, but with different importance weights. It demonstrates how applying variations to importance weights produces alternative beautiful compositions. Here we applied edge feathering to create softer transitions.

FIG. 12 presents a summarization of a trip to Paris in December. In this compact collage, we combined 14 images, which together give a summary of a December Paris experience.

In FIG. 13 we present a collage of 30 images of celebrities. Note how accurately the people are extracted from the input images. The assembly provides a compact, yet informative, cover of the canvas, leaving all faces visible.

FIG. 14(a) shows a collage of the 2008 Olympic games prepared using an embodiment of the present invention. It demonstrates how the shapes complete each other, just like a puzzle. Conversely, the collage of AutoCollage (FIG. 14(b)), prepared using a prior art system, places the rectangular regions surrounding the athletes almost on a grid. Although the athletes are usually smaller than in the collage of the present embodiments (FIG. 14a), the total area is larger due to the inclusion of many non-salient pixels as well as the grid-like assembly. It is noted that in AutoCollage the image sizes are automatically set and the user cannot fix them. The result achieved using the present embodiments is more compact due to the elimination of the non-salient pixels and the puzzle-like placement. We believe it is also more appealing.

Running Time:

An embodiment according to the present embodiments is implemented in Matlab and runs on a 2.4 GHz, dual core desktop. Saliency computation is the bottleneck of the present algorithm, since it performs a K-nearest neighbor algorithm. When using the exact nearest-neighbor implementation, it takes about 5 minutes per image (256 pixels, larger dimension), whereas using the approximation algorithm takes about 1 minute per image (with comparable results in most cases). ROI extraction takes about 30 seconds (500 pixels). The assemblage takes 3-10 seconds for a pair of images. One way to accelerate the algorithm is to implement the nearest-neighbor algorithm on the GPU. This may provide a speedup of a factor of 120.

There is thus provided a framework for producing collages, given a collection of images. To generate informative and pretty collages, we assemble exact cutouts of interesting regions in a puzzle-like manner. The paper makes several additional contributions. First, it introduces a new algorithm for saliency map computation, which competes favorably with previous work. Second, a novel region of-interest (ROI) extraction algorithm is presented. It is shown to extract non-rectangular regions that coincide with the meaningful object and background boundaries. Finally, the paper describes a composition algorithm that places these non-rectangular pieces together.

A property of the proposed framework is that it makes extensive use of the saliency maps. They are used in all stages of the ROI extraction algorithm as well as in the final assembly.

The present results show that assembling non-rectangular shapes manages to produce compact and pretty summaries of the image set. We have created collages of a variety of different scenarios, such as sports event, news, trips, and concepts. These demonstrate the general applicability of the method.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A computerized method of image processing to find salient pixels in a given image, the method comprising:
providing a dissimilarity measure between patches of said image, said dissimilarity measure combining an appearance component between respective patches and a distance component based on a distance between said respective patches;
finding a first patch of said image;
comparing said first patch with other patches at different distances from said first patch using said dissimilarity measure, thereby to obtain a score;
applying to each pixel of said first patch said obtained score;
continuing said comparing and scoring with additional patches of said image; and
outputting a saliency map indicating pixels and their corresponding saliency scores.

2. The method of claim 1, wherein said dissimilarity measure is a measure of a patch being distinctive in relation to its immediate vicinity and in relation to other regions in the image, and wherein said distinctiveness for each compared region is weighted for a distance to said patch.

3. The method of claim 1, comprising accumulating scores for said pixels from measurements taken from patches at different scales.

4. The method of claim 1, further comprising using face recognition on said image and assigning to pixels found to belong to a face a high saliency score.

5. The method of claim 1, further comprising setting pixels whose respective scores are above a predetermined high saliency threshold as a center of gravity and modifying scores of other pixels according to proximity to said center of gravity.

6. A computerized method of image processing to form a collage within a predetermined outline from a plurality of images, the method comprising: processing each image to assign a saliency measure to each pixel, said processing comprising: providing a dissimilarity measure between patches of said image, said dissimilarity measure combining an appearance component between respective patches and a distance component based on a distance between said respective patches; finding a first patch of said image; comparing said first patch with other patches at different distances from said first patch using said dissimilarity measure, thereby to obtain a score; applying to each pixel of said first patch said obtained score; continuing said comparing and scoring with additional patches of said image until each pixel obtains a score; from said scored pixels providing for each image a region of interest, by setting an initial boundary that encloses a predetermined set of highest scored pixels, and propagating a curve around said initial boundary in such a way as to minimize length and maximize included saliency; and combining said regions of interest into said collage by: ordering said image regions by importance; placing successive regions within said predetermined outline, said placing being to maximize saliency and compactness and minimize occlusion, thereby to form said collage.

7. The method of claim 6, wherein said dissimilarity measure is a measure of a patch being distinctive in relation to its immediate vicinity and in relation to other regions in the image, and wherein said distinctiveness for each compared region is weighted for a distance to said patch.

8. The method of claim 6, comprising accumulating scores for said pixels from measurements taken from patches at different scales.

9. The method of claim 6, further comprising using face recognition on said image and assigning to pixels found to belong to a face a high saliency score.

10. The method of claim 6, further comprising setting pixels whose respective scores are above a predetermined high saliency threshold as a center of gravity and modifying scores of other pixels according to proximity to said center of gravity.

11. The method of claim 6, wherein said pixels having relatively higher saliency scores comprise a smallest group of pixels whose scores add up to a predetermined proportion of an overall saliency score for said image.

12. The method of claim 11, wherein said proportion is substantially 90%.

13. The method of claim 6, wherein said maximizing and minimizing of said curve and maximizing and minimizing of said placing are carried out using respective cost minimization formulae.

14. The method of claim 13, wherein said cost function for placing further comprises a parameter setting a maximum occlusion.

15. The method of claim 14, wherein said cost function for placing penalizes occlusion of higher saliency pixels.

16. The method of claim 6, wherein said placing of image regions after said region of highest importance comprises making a plurality of trial placings and selecting a one of said trial placings which best succeeds with said to maximizing an overall saliency score of visible pixels, minimizing of occlusion of pixels, and maximizing of overall compactness.

17. The method of claim 6, wherein said outline contains a background image on which said regions of interest are placed, taking into account saliency scores on said background image.

\* \* \* \* \*